Oct. 13, 1931.  E. W. KELLOGG  1,827,588
FILM DRIVE
Filed Nov. 29, 1929
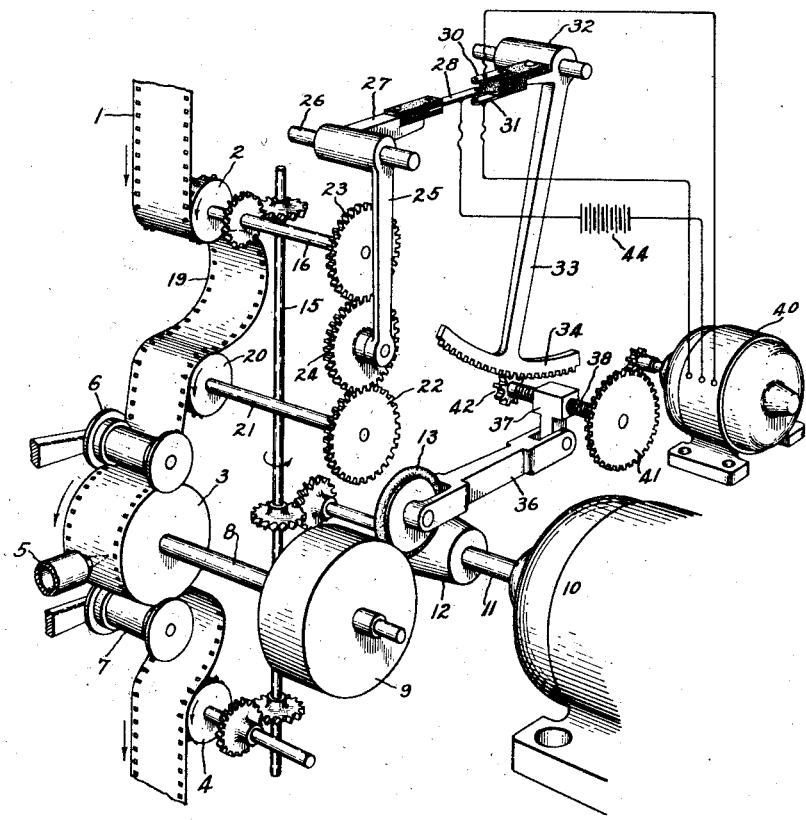
Inventor
Edward W. Kellogg,
by Charles E. Mullen
His Attorney.

Patented Oct. 13, 1931

1,827,588

UNITED STATES PATENT OFFICE

EDWARD W. KELLOGG, OF SCHENECTADY, NEW YORK, ASSIGNOR TO GENERAL ELECTRIC COMPANY, A CORPORATION OF NEW YORK

FILM DRIVE

Application filed November 29, 1929. Serial No. 410,284.

My invention relates to apparatus for recording sound on or reproducing sound from a film of the motion picture type. More particularly it relates to that part of the apparatus by which the film is supported and driven at a uniform speed.

When the sound recording or reproduction is done independently of the taking or the projection of motion pictures, as, for example, in a film phonograph, a film devoid of sprocket tooth openings may be used, and driven by means of smooth faced rollers. However, when the sound record is intended to be reproduced in synchronism with motion pictures it is usual to employ a film having sprocket tooth openings, such as is used for motion pictures, and to drive the film by sprockets which are geared or otherwise connected to the sprockets of the picture apparatus so as to have a definite speed relation therewith whereby exact synchronism is insured at all times between the pictures and the sounds. In the photographic recording of sound on a film and in the reproduction of sound from a film record it has been found necessary for the best results to cause the film to move past the light beam with a speed which to a high degree of perfection is free from all variations and which closely approaches a condition of absolute uniformity. A common source of speed variation of the film at the point of light interception is the vibration set up in the film as a result of improper sprocket tooth action such as occurs when, due to changes in length of the film, the pitch of the sprocket tooth openings is not exactly equal to the pitch of the sprocket teeth. To avoid film vibration due to this cause certain forms of apparatus have been constructed to support and move the film at the point of the light interception by a smooth faced roller or drum which is driven at a uniform speed, a sprocket or sprockets being also employed in the apparatus to insure the proper synchronism of movement of the film as has already been explained. With such an arrangement it has been found necessary to employ some means of varying the relative speeds of the sprocket and the drum in order that they shall both move the same amount of film in the same time without slippage of the film on the drum. It is the object of my invention to provide an improved film driving apparatus in which the film is driven jointly by a sprocket and a roller or drum and in which the speed of one of said members is varied in accordance with the amount of film moved by the respective members as determined by the number of film sprocket holes.

Briefly, my invention comprises in the form illustrated, a free running sprocket hole counter engaging that portion of the film moved by the drum and a variable speed driving mechanism for the drum controlled by the relative movement of a drive sprocket and the sprocket hole counter.

My invention will be better understood from the following description taken in connection with the accompanying drawing, and its scope will be pointed out in the appended claims.

Referring to the drawing in which the single figure is a diagrammatic representation of a preferred embodiment of my invention, the film 1 is shown driven jointly by the sprocket 2, the drum 3 and the sprocket 4, which elements the film engages serially in its passage downward through the apparatus. While my invention is applicable equally to a sound recorder and a sound reproducer, I have chosen to illustrate it as forming a part of a recorder. Accordingly, the exposing light directed on the film by the optical system 5 is caused to vary in accordance with the sound waves, the film being firmly supported and moved at a uniform speed at the point of light interception by the drum 3. It will be understood that the member 3 is essentially only a smooth faced wheel or roller but which on account of its relative size I have termed a drum. The film is pressed against its face by the two pressure rolls 6 and 7 and mounted on the same shaft 8 therewith is the driving cylinder 9. Driving motor 10 has on its shaft 11 the cone 12 and engaging the cone and cylinder is the axially movable rubber tired wheel 13. Shaft 11 is geared to the vertical shaft 15 which also is geared to rotate shaft 16 on which sprocket 2 is secured and is geared to the shaft to which sprocket 4 is secured. By this arrangement it will be seen that the two sprockets 2 and 4 are positively geared to the motor while the drum is rotated thereby through a variable speed connection.

The means by which the variable speed connection to the drum is controlled will now be described. Engaging the film directly above the drum 3 where it is drawn by the drum from the loop 19 is the sprocket hole counter 20 which is illustrated as a free running sprocket of the same diameter as sprocket 2. Mounted on the same shaft 21 with the counter 20 is the gear 22 and a like gear 23 is mounted on shaft 16. Meshing with gears 22 and 23 is gear 24 which is rotatably mounted on the end of the rocker arm 25 pivoted on shaft 26. A second arm 27 on this member supports the contact 28 which is positioned between and is adapted to engage either contact 30 or 31. The two latter contacts are supported by the pivoted member 32 having on the end of arm 33 the gear segment 34. The purpose of making the contacts 30 and 31 movable will be explained in a later paragraph. For a preliminary understanding of the principle of operation of the device, they may be regarded for the present as stationary contacts. Various means may be provided for shifting the position of the wheel 13 which by its position controls the speed of the drum. I have shown one such means for convenience as the carrier 36 at one end of which is mounted the wheel 13 and at the other end of which is pivoted the nut 37 engaging screw 38 which is driven in one direction or the other by the auxiliary motor 40 through suitable gearing shown at 41. Motor 40 is shown connected in circuit with the battery 44, the direction of rotation depending upon whether contact 28 engages contact 30 or contact 31. It will be understood that the drawing illustrating my invention is diagrammatic in character, many structural features common to such apparatus such as a supporting frame work, a casing and magazines for enclosing the film, pressure rolls for the sprockets, etc., having been omitted for the sake of greater clearness in illustrating the invention.

In the operation of the apparatus the film is driven jointly by the sprockets 2 and 4 and the drum 3. If the speed of the drum is such that the film moved thereby rotates the sprocket hole counter 20 the same amount as the sprocket 2 is rotated by the motor then the axis of the intermediate gear 24 will remain stationary and in the position illustrated, motor 40 being open circuited. If the number of sprocket tooth openings passing the counter 20 rotates it through a slightly greater angle than the angle rotated by sprocket 2 in a given time the position of the intermediate gear 24 will be shifted to the left closing the circuit of motor 40 through contacts 28 and 31. The resulting rotation of the motor 40 shifts the wheel 13 to the right where it will engage a portion of the cone 12 which is of smaller diameter and hence will rotate the drum 3 at a less speed. The converse takes place if the drum moves a less number of sprocket holes than sprocket 2 in a given time in which case the intermediate gear is shifted to the right. The motor is then energized through contacts 28 and 30 and is rotated in the opposite direction so that the drum is caused to have an increase in speed. It will be understood that the amount of movement of the axis of the intermediate gear 24 is slight and never is such that it seriously interferes with the proper meshing of this gear with gears 22 and 23. This differential gear and the sprocket hole counter are of light construction so that they offer but little resistance to the movement of the film.

The mechanism as so far described would serve to cause an increase in drum speed when the counter sprocket 20 lags behind the sprocket 2 in phase, and conversely to decrease the drum speed if the counter sprocket 20 advances in phase with respect to sprocket 2. The purpose of making contacts 30 and 31 movable will now be described. Were these contacts stationary there would be tendency for the drum speed to "hunt" or run for a while at too high a speed and then at too low a speed, repeating this cycle many times. If the drum, for example, has been running too fast, and the gear 24 has thereby been shifted to the left, causing contact point 28 to touch 31, motor 40 will operate to reduce the drum speed, but gear 24 will not begin to return to normal position until the speed has been reduced to such a point that the counter sprocket 20 runs slower than sprocket 2. By the time the contact between 28 and 31 is broken the speed will be too low, and a correction in the reverse direction will be required. Such hunting is prevented by causing contacts 30 and 31 to be moved whenever the roller 13 is shifted. Provision for this movement is shown in the pinion 42 which meshes with a gear sector 34 on the bell crank 32 one arm of which carries the contacts 30 and 31. Thus when the motor 40 operates it not only shifts nut 37 with the carriage 36 and roller 13, but also moves the contacts 30 and 31. The movement of these contacts is in such a direction as to tend to break whichever circuit is closed, and thus stop the motor 40. Assume now that the drum has been running too fast and gear 24 has been moved to the left with consequent closing of contact 31. Motor 40 will then operate to shift roller 13 to the right, thus reducing the drum speed, and at the same time it will move the gear sector 34 to the right and lower contact 31 until the circuit is broken, thus stopping the motor. If the motor stops before the speed of the drum has been reduced to the correct value, the counter sprocket 20 will continue to gain in phase as compared with sprocket 2, the gear 24 will be moved still farther to the left, and contact 31 will again be closed, and a further correction will be made, this process repeating until the correct speed is reached. In fact, the action may be continuous without any break in the circuit until the speed is equalized. If the motor 40 is very quick in its action it may break its own circuit several times before the correction is completed. On the other hand if the motor is sluggish the circuit may not be broken until the correction has been carried a little too far, and then a reverse correction will take place, but the desired equilibrium will be established with one or two reversals, and no serious tendency to hunt will be displayed.

Instead of recording directly on the drum 3 as illustrated it may be found desirable to draw the film by means of the drum through a gate of suitable construction. Similarly in a reproducing apparatus the drum may have a different construction to accommodate a photo-electric cell or the film may be drawn by the drum through a suitable gate. There are also many possible modifications of the differential gearing system, any one of which modifications can be made to register changes in phase between sprockets 20 and 2. It is obvious that a sprocket engaging the film is not the only possible device for connecting sprocket holes, that an electrical contact making counter, for example, might be arranged to perform the necessary function, but I have chosen the sprocket for illustration since it constitutes a very simple form of counter.

It will be apparent that various modifications may be made in the embodiment of my invention which I have described and illustrated without departing from the spirit and scope of my invention which modifications I aim to cover by the appended claims.

What I claim as new and desire to secure by Letters Patent of the United States is:—

1. Apparatus for driving a film having sprocket tooth openings therein comprising a sprocket member and a drum member arranged in successive engagement with the film, driving means for said sprocket and drum members, and means responsive to a difference in speed of those portions of the film moved by the respective sprocket and drum members as determined by the sprocket tooth openings and independently of the length of film between said members for varying the speed of one of said members.

2. Apparatus for driving a film having sprocket tooth openings therein comprising a sprocket member and a member having a smooth periphery arranged for successive engagement with the film, a sprocket hole counter arranged to engage said film where it is moved by the latter member, and means responsive to a predetermined relative movement of said sprocket and counter for varying the speed of one of said members.

3. Apparatus for driving a film having sprocket tooth openings therein comprising a sprocket and a drum arranged for successive engagement with the film, driving means therefor, a sprocket hole counter arranged to engage the film where it is moved by the drum, and means responsive to the difference in the number of sprocket holes passing said counter and said sprocket, for varying the speed of one of said members.

4. Apparatus for driving a film having sprocket tooth openings therein comprising a sprocket member and a drum member arranged for successive engagement with the film, a common driving member for said members, a sprocket hole counter arranged to engage the film where it is moved by the drum member, a variable speed drive connection between the driving member and the drum member and mechanism responsive to a predetermined change in angular position of said sprocket member and counter for controlling said variable speed driving connection.

5. Apparatus for driving a film provided with sprocket tooth openings comprising a sprocket and a drum arranged for successive engagement with the film, a motor having driving connections with said sprocket and drum, a sprocket driven by the film at a point where the film is moved by the drum, said driving connections including a variable speed connection with said drum and means operatively connected with both of said sprockets for controlling the variable speed connection in response to a predetermined difference in movement of the sprockets.

6. Apparatus for driving a film provided with sprocket tooth openings comprising sprocket and drum members arranged for successive engagement with the film, a motor having driving connections with said sprocket and drum members, a sprocket driven by the film at a point where the film is moved by the drum member, said driving connections including a variable speed connection with one of said members for correcting the speed of said one member, means operatively connected with both of said sprockets for controlling the variable speed connection in response to a predetermined difference in movement of the sprockets, and means responsive to the operation of the variable speed connection for preventing an over-correction of the speed of said one member.

7. Apparatus for driving a film provided with sprocket tooth openings comprising a sprocket and a drum arranged for successive engagement with the film, a motor having a gear connection with said sprocket, and having a variable speed connection with said drum, a sprocket driven by the film at a point where the film is moved by the drum, a differential gear mechanism having gears rotated respectively by said sprockets and an intermediate gear meshing therewith, contact mechanism controlled by the position of said intermediate gear and means controlled by said contact mechanism for operating said variable speed connection.

8. Apparatus for driving a film provided with sprocket tooth openings comprising a sprocket and a drum arranged for successive engagement with the film, a motor connected to drive the sprocket, a variable speed connection between the motor and the drum including a speed controlling device for correcting the speed of the drum, a sprocket driven by the film at a point where the film is moved by the drum, a differential gear mechanism between said sprockets, means controlled by said differential gear mechanism for moving said speed controlling device, and means responsive to the movement of said device for causing the speed correcting action of said variable speed connection to cease before the phase relation between said sprockets returns to that at which the correcting action started.

In witness whereof, I have hereunto set my hand this 27th day of November, 1929.

EDWARD W. KELLOGG.